UNITED STATES PATENT OFFICE.

MARCUS H. HULINGS, OF ALLEGHENY, PENNSYLVANIA, ASSIGNOR OF ONE-HALF TO WILLIAM H. OSBORNE, OF RICHMOND BOROUGH, NEW YORK, N. Y.

PROCESS AND COMPOUND FOR TREATING MANTLES.

No. 889,308.

Specification of Letters Patent.

Patented June 2, 1908.

Application filed May 13, 1907. Serial No. 373,292.

*To all whom it may concern:*

Be it known that I, MARCUS H. HULINGS, a citizen of the United States, and residing at Allegheny, Allegheny county, State of Pennsylvania, have invented a certain new and useful Process and Compound for Treating Mantles; and I do declare the following to be a clear, full, and exact description of the invention.

The invention relates to a process and compound for treating mantles used in connection with burners where gas is burned for illuminating purposes. They consist of a perforated filamentary structure which is very fragile and therefore subject to easy destruction due to jars, air drafts etc.

The object of my process is to increase the stability of such mantles after completed in their regular course of manufacture so as to increase the length of their usefulness and to render them capable to resist more readily such influences which favor their destruction.

My process for treating mantles for such purpose consists substantially of applying to them when they are about to be taken in use a compound in powder-form which is sprinkled over a mantle when the same is placed in position above the flame and after the usual coating has been burned off from it, so that the powder comes in actual contact with the substance of which the mantle is composed and becomes capable of adhering thereto. The flame during the application of the powder may be somewhat reduced. The powder so applied consists of matter which is capable of becoming incandescent without oxidation, so that by this added material the substance of the mantle, capable of becoming incandescent, is increased whereby the brilliancy of the light is materially enhanced. A suitable composition for this compound is common salt, lime, alum and borax, or their equivalents, with sufficient coloring matter added to show the effect when used, so that the same may be properly and evenly applied, all being in powder form, the whole mass thoroughly and evenly intermixed. The addition of such powder, most of which combines with the delicate fabric of the mantle, hardens the same and renders it more durable.

The preferable proportions of the ingredients for this compound are 50% of the common salt, 40% of the lime, 5% of the alum and 5% of the borax. As a coloring matter powdered charcoal may be used, sufficient being added to show color.

Having described my invention, I claim as new.

1. The process of treating mantles after completed in their regular course of manufacture to increase their durability and capacity for incandescence and which consists of burning off their coating and of sprinkling directly onto them, while in position for use, a powder which is capable of adhering to the material of the mantle and of becoming incandescent.

2. The process of treating mantles after completed in their regular course of manufacture to increase their durability and capacity for incandescence and which consists of burning off their coating and of applying to them when placed in position for use, a powder consisting of a mixture of common salt, lime, alum and borax.

3. A compound for treating mantles and which is to be applied to them when ready for use to increase their durability and capacity for incandescence, the same consisting of a powder composed of common salt, lime, alum and borax.

4. A compound for treating mantles and which is to be applied to them when ready for use to increase their durability and capacity for incandescence, the same consisting of a powder composed of 50% common salt, 40% lime, 5% alum and 5% borax, and matter added to give color.

In testimony whereof, I hereunto affix my signature in the presence of two witnesses.

MARCUS H. HULINGS.

Witnesses:
WILLIAM H. OSBORNE,
ARTHUR Q. CARPENTER.